United States Patent
Guleria et al.

(10) Patent No.: US 8,300,772 B2
(45) Date of Patent: Oct. 30, 2012

(54) METHOD AND APPARATUS FOR EMERGENCY CALL PROCESSING

(75) Inventors: Vikram Guleria, Milpitas, CA (US);
Ashish Singh, San Jose, CA (US);
Shobhit Bansal, Milpitas, CA (US);
Sachin Gupta, Milpitas, CA (US);
Santosh Panattu Sethumadhavan, Santa Clara, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 894 days.

(21) Appl. No.: 12/408,385

(22) Filed: Mar. 20, 2009

(65) Prior Publication Data

US 2010/0166153 A1 Jul. 1, 2010

Related U.S. Application Data

(60) Provisional application No. 61/142,167, filed on Dec. 31, 2008.

(51) Int. Cl.
*H04M 11/00* (2006.01)
(52) U.S. Cl. ............... 379/45; 379/37; 379/49; 370/352
(58) Field of Classification Search .............. 379/37–45; 370/352, 400, 466
See application file for complete search history.

(56) References Cited

U.S. PATENT DOCUMENTS

2007/0019619 A1 * 1/2007 Foster et al. ................ 370/352
2007/0104183 A1 5/2007 Bakke et al.
2007/0274462 A1 * 11/2007 Wu .............................. 379/37

OTHER PUBLICATIONS

PCT International Search Report and Written Opinion for PCT/US09/69756, mailed Feb. 25, 2010, 12 pages.
Taylor, Tom et al., MultiService Forum Architecture Framework, MSF Release 3 Architecture, MSF-ARCH-003.00-FINAL, Jun. 2, 2006, 49 pages.
Infrastructure of Audiovisual Services—Communication Procedures, Series H: Audiovisual and Multimedia Systems, Gateway Control Protocol: Version 3, ITU-T Recommendation H.248.1, Telecommunication Standardization Sector of ITU, Sep. 2005, 206 pages.

* cited by examiner

*Primary Examiner* — Melur Ramakrishnaiah
(74) *Attorney, Agent, or Firm* — Blakely Sokoloff Taylor & Zafman, LLP

(57) ABSTRACT

In one embodiment of the invention, a number of transport protocol streams are established between a signaling session border controller (S-SBC) and a data session border controller (D-SBC). A subset of the number of transport protocol streams are dedicated for carrying messages for emergency calls. Upon receiving an emergency call, the S-SBC transmits an add request message to the D-SBC over one of the streams dedicated for carrying messages for emergency calls. Upon receiving the message over one of the streams dedicated for carrying messages for emergency calls, the D-SBC processes the message with high priority handling.

20 Claims, 10 Drawing Sheets

METHOD AND APPARATUS FOR EMERGENCY CALL PROCESSING

CROSS-REFERENCE TO RELATED APPLICATIONS

This application claims the benefit of U.S. Provisional Application No. 61/142,167, filed Dec. 31, 2008, which is hereby incorporated by reference.

BACKGROUND

1. Field

Embodiments of the invention relate to the field of network processing; and more specifically to emergency call processing in a distributed session border controller (SBC) system.

2. Background

A distributed session border controller (SBC) system includes a signaling SBC (S-SBC) and a data SBC (D-SBC). The S-SBC controls the opening, closing, and policing of traffic flows through the D-SBC through a standard interface (e.g., the Ia interface defined by ETSI (European Telecommunications Standards Institute) TISPAN (Telecommunications and Internet converged Services and Protocols for Advanced Networking) which uses the H.248 control protocol ("Gateway control protocol: Version 3", ITU-T Recommendation H.248.1, September 2005). H.248 messages are transmitted between the S-SBC and the D-SBC.

Emergency calls (e.g., 911 calls or other local emergency numbers) that are received by the S-SBC are processed at the highest priority. Similarly, the D-SBC processes emergency calls at a high priority. In order to process the emergency calls at a high priority, the S-SBC and the D-SBC need to determine that the call is an emergency call. Typically, the S-SBC determines whether a call is an emergency call by performing number analysis on the dialed number (e.g., determining whether the dialed number is an emergency number). After determining the call is an emergency call, the S-SBC transmits a H.248 add message to the D-SBC, the add message including an emergency indicator token (the H.248 protocol defines the emergency indicator token). The D-SBC receives the H.248 add message and parses the H.248 message to extract the emergency indicator token. Until extracting the emergency indicator token, the D-SBC does not give high priority to that emergency call.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
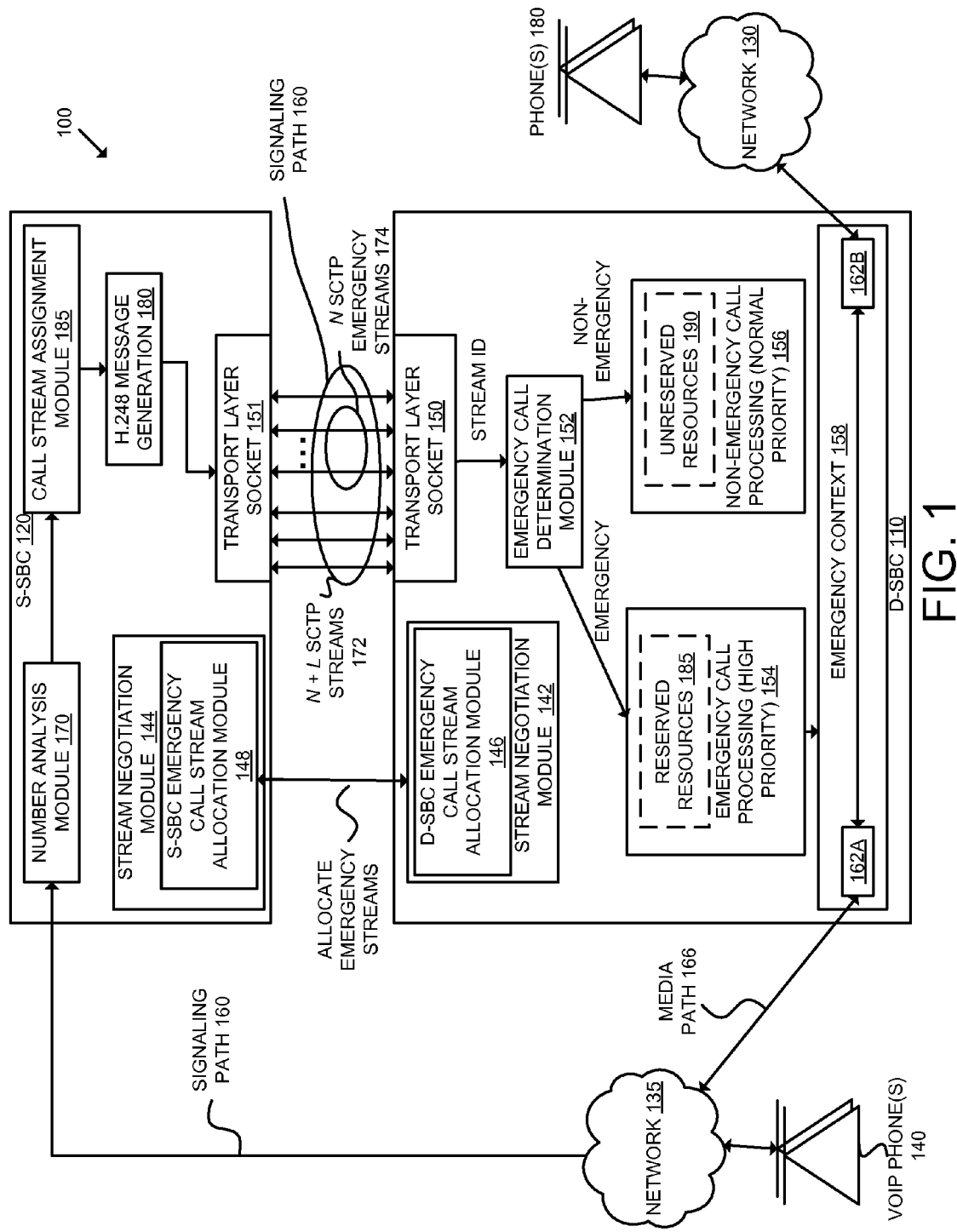
FIG. 1 illustrates an exemplary distributed session border controller system processing emergency calls according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer end station, a network element, etc.). Such electronic devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, computer end stations, etc.). Some network elements are "multiple services network elements" that provide support for multiple networking functions (e.g., routing, bridging, switching, Layer 2 aggregation, and/or subscriber management), and/or provide support for multiple application services (e.g., data, voice, and video). Subscriber computer end stations (e.g., workstations, laptops, palm tops, mobile phones, smartphones, multimedia phones, portable media players, GPS units, gaming systems, set-top boxes, etc.) access content/services provided over the Internet and/or content/services provided on virtual private networks (VPNs) overlaid on the Internet. The content and/or services are typically provided by one or more server computer end stations belonging to a service or content provider, and may include public webpages (free content, store fronts, search services, etc.), private webpages (e.g., username/password accessed webpages providing email services, etc.), corporate networks over VPNs, etc. Typically, subscriber computer end stations are coupled (e.g., through customer premise equipment coupled to an access network (wired or wirelessly)) to edge network elements, which are coupled (e.g., through one or more core network elements to other edge network elements) to the server computer end stations.

A method and apparatus for emergency call processing in a distributed session border controller system is described. In one embodiment of the invention, a number of transport protocol streams (e.g., Stream Control Transmission Protocol (SCTP) streams) are established between a signaling session border controller (S-SBC) and a data session border controller (D-SBC). The transport protocol streams are used to transmit H.248 messages between the S-SBC and the D-SBC. A subset of the negotiated number of transport streams are dedicated for carrying messages for emergency calls, and an amount of processing resources (e.g., memory, queue, media port, bandwidth, etc.) is reserved on the S-SBC and the D-SBC for processing emergency calls. The S-SBC determines whether a received call is an emergency call (e.g., through number analysis). If the received call is an emergency call, the S-SBC assigns the call to one of the transport streams dedicated for emergency calls. If the received call is not an emergency call, the S-SBC assigns the call to one of the other transport streams not dedicated for carrying messages for emergency calls. The S-SBC transmits an add request message to the D-SBC over the assigned transport stream. The D-SBC receives the add request message on the assigned transport stream, and based on the stream identifier of the assigned transport stream, begins processing the add request message. If the stream identifier is associated with a transport stream dedicated for carrying messages for emergency calls, the D-SBC processes the message at a high priority using the reserved resources. If the stream identifier is not associated with a transport stream dedicated for carrying messages for emergency calls, the D-SBC processes the message at a normal priority.

In another embodiment of the invention, the S-SBC and the D-SBC each have multiple independent processing units (IPUs) (e.g., processor cores, threads, etc.). The number of transport protocol streams are divided among the IPUs. Upon receiving an emergency call, the S-SBC selects one of the IPUs that has a stream dedicated for emergency processing and transmits an add request message to the S-SBC over this transport stream. The D-SBC receives the add request message, associates the add request message with a stream identifier corresponding to the transport stream, and replies to the S-SBC on the negotiated transport stream. For subsequent messages received by the S-SBC and the D-SBC over the negotiated transport stream, a load balancer on the S-SBC and the D-SBC checks the stream ID to redirect the messages to the correct IPU without parsing the messages.

FIG. 1 illustrates an exemplary distributed session border controller system 100 for processing emergency calls according to one embodiment of the invention. The distributed session border controller system 100 includes the signaling session border controller (S-SBC) 120, which is coupled with the data session border controller (D-SBC) 110. The S-SBC 120 is coupled with the network 135 (e.g., an IP access network). The voice over Internet Protocol (VoIP) phone(s) 140 are coupled with the D-SBC 110 through the network 135. The D-SBC is coupled with the network 135 and the network 130 (e.g., the core network). The phone(s) 180 are coupled with the network 130.

The S-SBC 120 performs signaling (e.g., establishing a call) and the D-SBC 110 processes the data (e.g., the conversation of a call). In one embodiment of the invention, the S-SBC 120 controls the opening, closing, and policing of traffic flows on the D-SBC 110 through standard Ia interfaces defined by the H.248 control protocol, and H.248 messages are transmitted between the S-SBC 120 and the D-SBC 110 over transport streams (e.g., Stream Control Transmission Protocol (SCTP) streams (defined in Request for Comments (RFC) 4960, "Stream Control Transmission Protocol", September 2007)) 1 in one of the N+L SCTP transport streams 172. Each of the transport streams is identifiable with a transport stream identifier.

The signaling path 160 includes the messages from the VoIP phone(s) 140 when requesting calls (e.g., SIP INVITE messages), and the messages transmitted between the S-SBC 120 and the D-SBC 110 during establishment, modification, and teardown of the call. The media path 166 includes the messages carrying the media (e.g., the conversation) of the call.

As an example, after the S-SBC 120 receives a call from one of the VoIP phone(s) 140, the S-SBC 120 and D-SBC 110 exchange a series of H.248 messages to establish the call. For example, the S-SBC 120 transmits a H.248 add request message to the D-SBC 110 (the add request message includes parameters for setting up the call). The D-SBC 110 transmits a H.248 add reply message to the S-SBC 120 which acknowledges that resources for the call have been established. After a call is established, the media (e.g., the conversation during the call) is processed through the media path 166. In addition to H.248 add request messages, the S-SBC 120 and D-SBC 110 may exchange other H.248 messages (e.g., Modify, Subtract, Move, AuditValue, AuditCapability, Notify, ServiceChange, etc.).

The signaling path 160 and the media path 166 are logical constructs illustrating the path of messages. It should be understood that the D-SBC 110 may be implemented as part of a multiple services network element, which may provide routing functionality. In that case, some of the packets for the signaling path 160 may be received by the multiple services network element (the D-SBC 110), which will forward those packets to the S-SBC 120. In addition, it should be understood that the S-SBC 120 and the D-SBC 110 may be implemented on the same network element in some embodiments of the invention.

The S-SBC 120 includes the number analysis module 170, the call stream assignment module 185, the H.248 message generation module 180, the transport layer socket 151, and the stream negotiation module 144, which includes the S-SBC emergency call stream allocation module 148). It should be understood that the S-SBC 120 may include multiple independent processing units (IPUs) (e.g., processor cores, threads, etc.), which will be described in greater detail later herein.

The D-SBC 110 includes the stream negotiation module 142, which includes the D-SBC emergency call stream allocation module 146), the transport layer socket 150, the emergency call determination module 152, the emergency call processing (high priority) module 154, the non-emergency call processing (normal priority) module 156, the emergency context 158, and the pinhole pair 162A and 162B. A pinhole is a configuration of two associated H.248 IP terminations (e.g., 162A and 162B) within the same H.248 Context (e.g., emergency context 158), which allows and/or prohibits unidirectional forwarding of IP packets under specified conditions. A H.248 context is an association between a collection of terminations. An emergency context is a context that indicates high priority handling.

The transport layer sockets 150 and 151 each include one or more socket buffers which act as queues for incoming and outgoing messages. Typically, messages are sent and removed from the socket buffer in the order in which they are put into the socket buffer.

Figure 2:
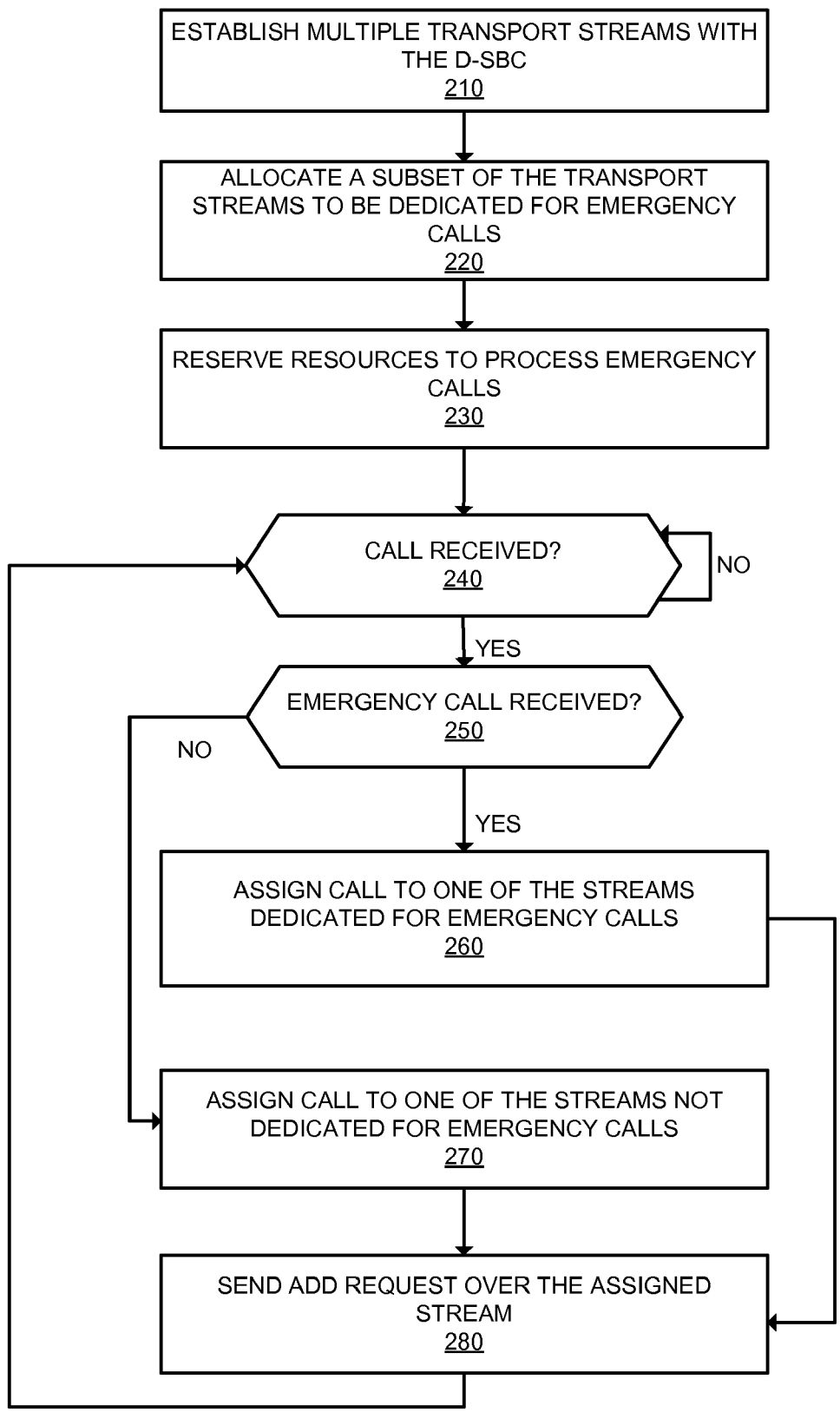
FIG. 2 is a flow diagram illustrating an exemplary method performed on a signaling session border controller for processing emergency calls according to one embodiment of the invention.

FIG. 2 is a flow diagram illustrating an exemplary method performed by the S-SBC 120 to process emergency calls according to one embodiment of the invention. The operations of FIG. 2 will be described with reference to the exemplary embodiment of FIG. 1. However, it should be understood that the operations of FIG. 2 can be performed by embodiments of the invention other than those discussed with reference to FIG. 1, and the embodiments discussed with reference to FIG. 1 can perform operations different than those discussed with reference to FIG. 2.

At block 210, the S-SBC 120 establishes multiple transport streams (e.g., SCTP streams) with the D-SBC 110. According to one embodiment of the invention, the S-SBC 120 and the D-SBC 110 negotiate the number of transport streams. With reference to FIG. 1, the stream negotiation module 144 of the S-SBC 120 negotiates a plurality of transport streams (e.g., N+L SCTP streams 172) with the stream negotiation module 142 of the D-SBC 110. The negotiated transport streams are used to carry H.248 messages between the D-SBC 110 and the S-SBC 120. In another embodiment of the invention, an operator of the distributed session border controller system 100 configures the number of transport streams. Flow moves from block 210 to block 220.

At block 220, the S-SBC 120 allocates a subset (e.g., one or more) of the multiple transport streams to be dedicated for carrying messages for emergency calls. With reference to FIG. 1, the S-SBC emergency call stream allocation module 148 allocates a subset of the plurality of negotiated streams (e.g., N SCTP emergency streams 174 from the N+L SCTP streams 172) to be dedicated solely for emergency call H.248 related messages. Thus, the transport streams allocated for emergency call processing are used to carry H.248 messages between the S-SBC 120 and the D-SBC 110 for emergency calls only. It should be understood that the emergency calls include the 911 number, local and/or state emergency numbers, and/or any other number configured to be an emergency number. According to one embodiment of the invention, the same number of streams is dedicated for emergency call processing by the D-SBC 110. Flow moves from block 220 to block 230.

At block 230, the S-SBC 120 reserves processing resources (e.g., memory, processing cycles, media ports, queues, contexts, etc.) to process emergency calls. According to one embodiment of the invention, the S-SBC 120 creates one or more emergency contexts during initial registration with the D-SBC 110. An emergency context is an association between a collection of terminations dedicated for emergency calls. With reference to FIG. 1, an emergency context 148 has been created on the D-SBC 110 and the terminations 162A and 162B have been added or moved to this preallocated context. A termination is a logical entity that sources and/or sinks media and/or control streams. Each termination is associated with a number of parameters, which are grouped in a set of descriptors that are included in commands sent by the S-SBC 120. Terminations are typically created with use of an H.248 Add command. Each context is associated with a plurality of attributes, including the mode property (which will describe the flow of the media at the D-SBC 110 (e.g., send only, receive only, inactive, send-receive)), the priority, an indicator or an emergency call (to provide for a high priority in processing), and a descriptor (e.g., a remote descriptor, a local descriptor, an events descriptor). Flow moves from block 230 to block 240.

According to one embodiment of the invention, during registration of the D-SBC 110, the S-SBC 120 creates one or more emergency call contexts (a context with the emergency call indicator set) on the D-SBC 110, each emergency call context having one ephemeral termination with a mode set as inactive and a local descriptor. An ephemeral termination typically is one that exists only for the duration of its use. After receiving an emergency call, the corresponding termination will be added or moved to the preallocated context (e.g., the emergency context 158) and the mode will be set as send-receive. Since one or more emergency contexts on the D-SBC 110 are preallocated and resources are reserved (e.g., memory, processing cycles, media ports, queues, etc.), processing of an emergency call is faster than typical prior art implementations.

Figure 7:
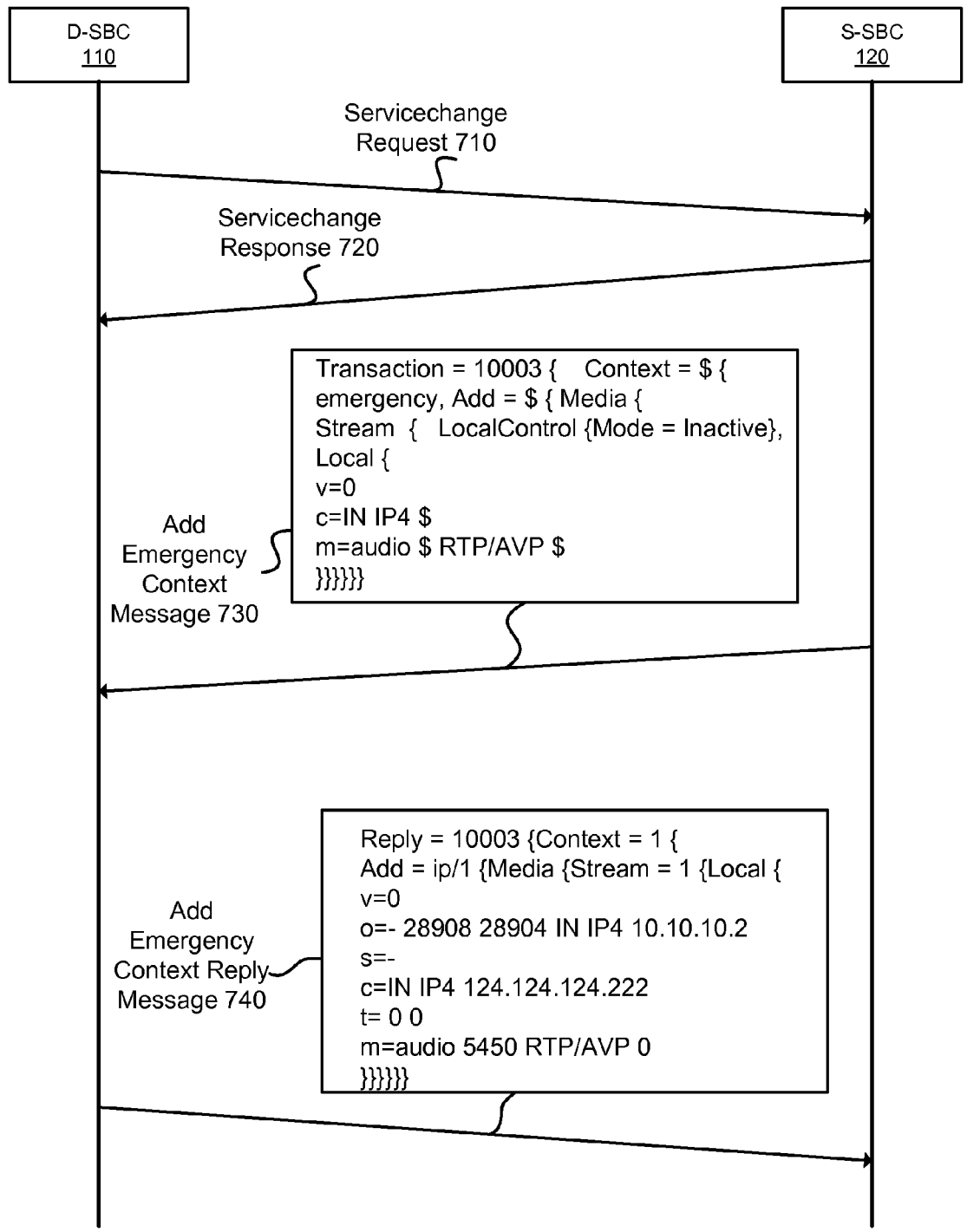
FIG. 7 is a data flow diagram illustrating an exemplary traffic flow between a S-SBC and a D-SBC to pre-allocate emergency context(s) according to one embodiment of the invention.

FIG. 7 is a data flow diagram illustrating an exemplary traffic flow between the S-SBC 120 and the D-SBC 110 for the preallocation of emergency context(s) according to one embodiment of the invention. At operation 710, the D-SBC 110 transmits a servicechange request message to the S-SBC 120. The servicechange request message in this case indicates to the S-SBC 120 to announce that the D-SBC 110 is available to provide services. According to one embodiment of the invention, the D-SBC 110 transmits a servicechange request message to the S-SBC 120 when it wants to be registered with the S-SBC 120. At operation 720, the S-SBC 120 transmits a servicechange reply message to the D-SBC 110 acknowledging the received servicechange request message.

At operation 730, the S-SBC 120 transmits an add emergency context message to the D-SBC 110. The add emergency context message includes the emergency indicator attribute set, the mode set to inactive, and a local descriptor. At operation 740, the D-SBC 110 transmits an add emergency context reply message to the S-SBC 120. The add emergency context reply message notifies the S-SBC 120 that an emergency context has been added and other network information (e.g., an IP address associated with the emergency context, etc.).

Referring back to FIG. 2, at block 240, the S-SBC 120 waits to receive a call. If a call has been received, then flow moves to block 250. At block 250, the S-SBC 120 determines whether the received call is an emergency call. For example, with reference to FIG. 1, the number analysis module 170 performs number analysis on the dialed call to determine whether the dialed call is an emergency number. For example, if the dialed number is 911 (or other emergency numbers or other predefined numbers), the number analysis module 170 causes the call to be processed at a high priority (e.g., using the resources reserved for emergency calls at block 230). If the call is an emergency call, then flow moves to block 260. If the call is not an emergency call, then flow moves to block 270.

At block 260, the emergency call is assigned to one of the transport streams dedicated for emergency calls. With reference to FIG. 1, the call stream assignment module 185 assigns the emergency call to one of the N SCTP emergency transport streams 174. Flow moves from block 260 to block 280.

At block 270, the non-emergency call is assigned to one of the transport streams not dedicated for emergency calls. With reference to claim 1, the call stream assignment module 185 assigns the non-emergency call to one of the L SCTP streams. Flow moves from block 270 to block 280.

At block 280, an add request message is generated and transmitted to the D-SBC 110 over the assigned transport stream. With reference to FIG. 1, the H.248 message generation module 180 generates a H.248 add message, and the add message is transmitted to the D-SBC 110 over the assigned stream through the transport layer socket 151. Flow moves from block 280 back to block 240.

Figure 8:
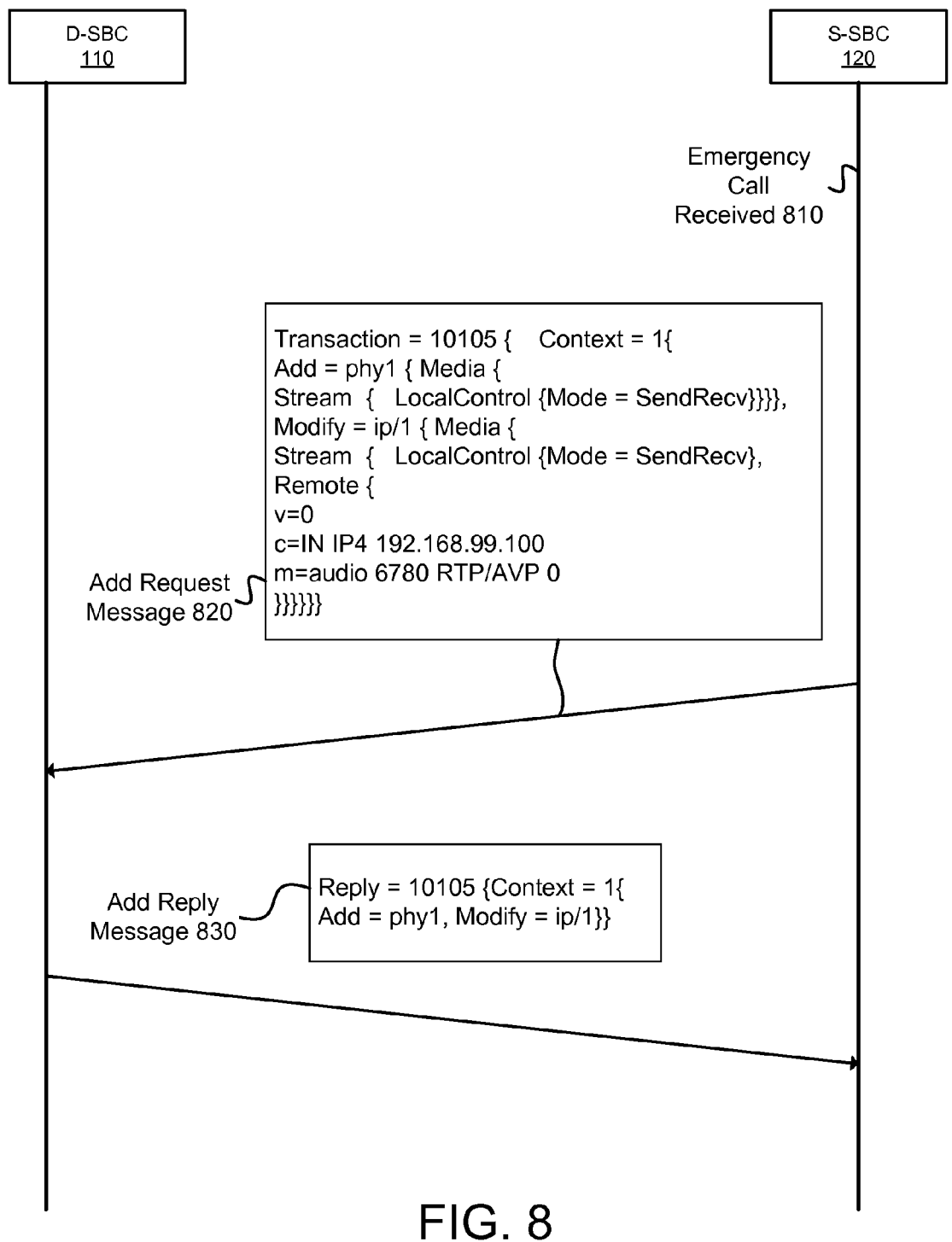
FIG. 8 is a data flow diagram illustrating an exemplary traffic flow between a S-SBC and a D-SBC during call establishment according to one embodiment of the invention.

FIG. 8 is a data flow diagram illustrating an exemplary traffic flow between the S-SBC 120 and the D-SBC 110 during call establishment according to one embodiment of the invention. According to one embodiment of the invention, the messages transmitted between the S-SBC 120 and the D-SBC 110 illustrated in FIG. 8 correspond with the messages illustrated in FIG. 7. For example, the add request message in FIG. 8 requests the D-SBC 110 to add an emergency call to the emergency call context established with the messages in FIG. 7. While the messages in FIG. 8 are related to an emergency call, non-emergency calls are established in a similar manner with the exception that they will not be assigned to an emergency context and will not be transmitted over one of the transport streams dedicated for carrying emergency calls.

At operation 810, the S-SBC 120 has received an emergency call. At operation 820, the S-SBC 120 transmits a H.248 add request message to the D-SBC 110 over one of the transport streams dedicated for carrying emergency calls. This add request message adds the termination to the emergency context (which was preallocated as described with reference to FIG. 7), and the descriptor is set with a mode as send-receive. At operation 820, the D-SBC 110 transmits an add reply message to the S-SBC 120, which notifies the S-SBC 120 that the termination has been added to the emergency context and that the call has been established.

Figure 3:
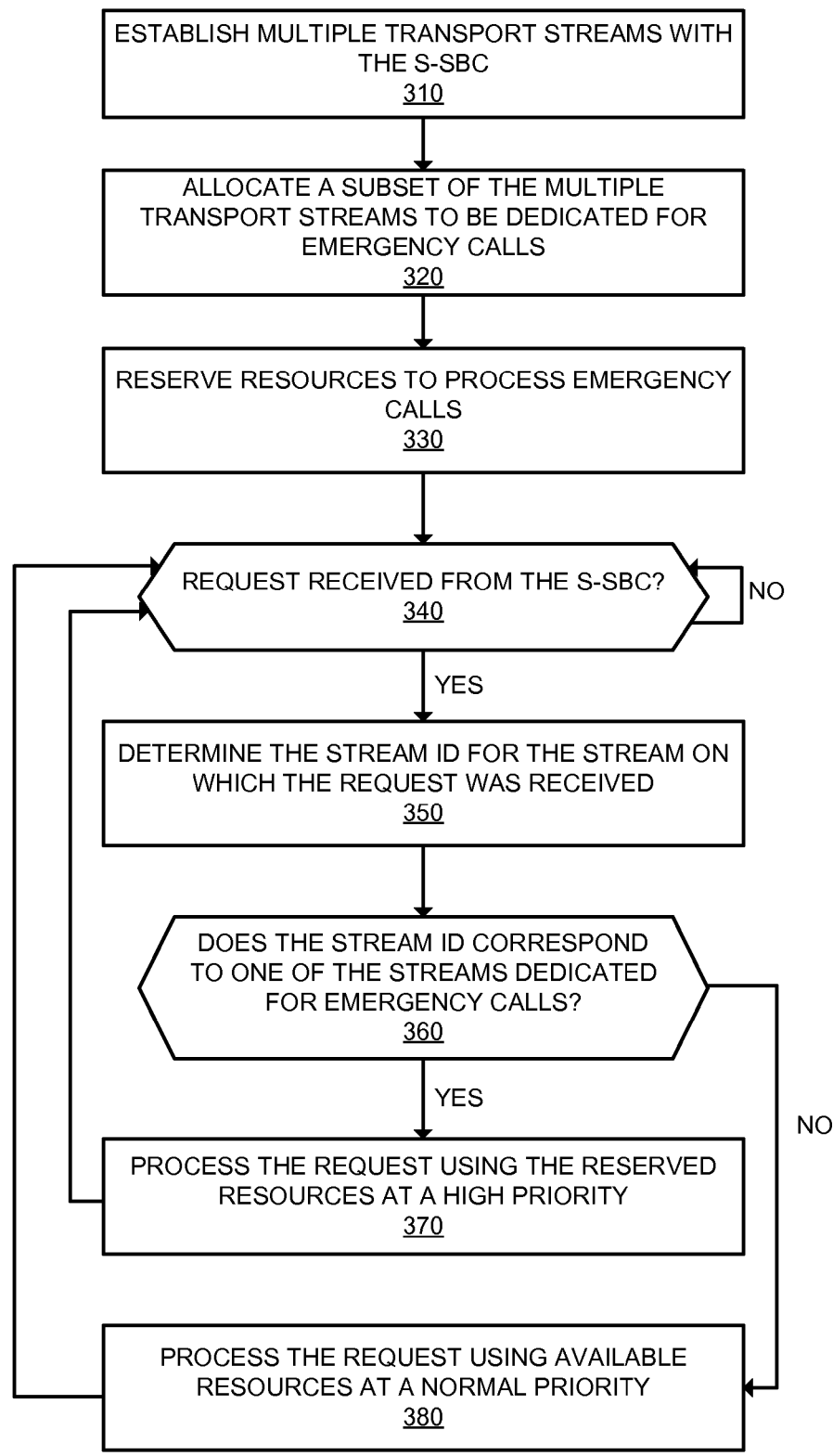
FIG. 3 is a flow diagram illustrating an exemplary method performed on a data session border controller for processing exemplary computer system according to one embodiment of the invention.

FIG. 3 is a flow diagram illustrating an exemplary method performed by the D-SBC 110 to process emergency calls according to one embodiment of the invention. The operations of FIG. 3 will be described with reference to the exemplary embodiment of FIG. 1. However, it should be understood that the operations of FIG. 3 can be performed by embodiments of the invention other than those discussed with reference to FIG. 1, and the embodiments discussed with reference to FIG. 1 can perform operations different than those discussed with reference to FIG. 3.

At block 310, the D-SBC 110 establishes multiple transport streams (e.g., SCTP streams) with the S-SBC 120. According to one embodiment of the invention, the D-SBC 110 negotiates the transport streams with the S-SBC 120. For example, with reference to FIG. 1, the stream negotiation module 142 of the D-SBC 110 negotiates with the stream negotiation module 144 of the S-SBC 120 a plurality of transport streams (e.g., N+L SCTP streams 172). The negotiated transport streams are used to carry H.248 messages between the D-SBC 110 and the S-SBC 120. According to another embodiment of the invention, the number of transport streams is controlled by an operator of the distributed session border controller system 100. Flow moves from block 310 to block 320.

At block 320, the D-SBC 110 allocates a subset (e.g., one or more) of the transport streams to be dedicated for carrying messages for emergency calls. With reference to FIG. 1, the D-SBC emergency call stream allocation module 146 allocates a subset of the plurality of negotiated streams (e.g., N SCTP emergency streams 174 from the N+L SCTP streams 172) to be dedicated solely for emergency call H.248 related messages. Thus, the transport streams allocated for emergency call processing are used to carry H.248 messages between the S-SBC 120 and the D-SBC 110 for emergency calls only. It should be understood that the emergency calls include the 911 number, local and/or state emergency numbers, and/or any other number configured to be an emergency number. According to one embodiment of the invention, the same number of streams is dedicated for emergency call processing by the S-SBC 120 (e.g., as described in block 220 of FIG. 2). Flow moves from block 320 to block 330.

At block 330, the D-SBC 110 reserves processing resources (e.g., memory, processing cycles, media ports, queues, contexts, etc.) to process emergency calls. According to one embodiment of the invention, the D-SBC 110 creates one or more emergency contexts responsive to direction from the S-SBC 120 during registration. For example, as described with reference with FIG. 7, responsive to receiving an add emergency context message (e.g., the add emergency context message 730) from the S-SBC 120, the D-SBC 110 creates an emergency context based on the parameters included in the add message. It should be understood that these one or more emergency contexts are created prior to receiving an emergency call. With reference to FIG. 1, an emergency context 148 has been created on the D-SBC 110 and the terminations 162A and 162B have been added or moved to this preallocated context. Flow moves from block 330 to block 340.

At block 340, the D-SBC 110 waits to receive a request message from the S-SBC 120 (e.g., an add request message, a modify request message, a subtract request message, or other request messages). If a request message has been received, flow moves to block 350. With reference to FIG. 1, the request messages will be received at the transport layer socket 150 over one of the transport streams (e.g., the N+L SCTP streams 172). At block 350, the stream identifier for the transport stream on which the request message was received is determined. As described above, each of the transport streams is identifiable with a transport stream identifier (the transport stream identifier is included in the stream carrying the request messages). Thus, during processing of the message at the transport layer (e.g., at the transport layer socket 150), the stream identifier of the steam on which the message was received is determined. Flow moves from block 350 to block 360.

It should be understood that the determination of the transport stream identifier occurs prior to the content of the request message being parsed. For example, once the message is received at the transport layer socket 150 and is processed to be placed in a socket buffer, the transport stream identifier will be known. Since certain stream identifiers correspond with streams dedicated for carrying messages for emergency calls, determining whether a message is for an emergency call occurs prior to parsing the content of the message (e.g., prior to parsing the H.248 message to determine whether the emergency indicator token is set). Thus, embodiments of the invention can determine whether a call is an emergency call without parsing an H.248 message.

At block 360, the emergency call determination module 152 determines whether the stream identifier associated with the message corresponds to one of the transport streams dedicated for emergency calls. If the stream identifier corresponds with a stream dedicated for emergency calls, then flow moves to block 370. If the determined stream identifier does not correspond with a stream dedicated for emergency calls, then flow moves to block 380. At block 370, the request message corresponding to an emergency call is processed using the reserved resources 185 at the emergency call processing (high priority) module 154. At block 380, the request message corresponding to a non-emergency call is processed using the unreserved resources 190 at the non-emergency call processing (normal priority) module 156. Thus, messages related to emergency calls are processed at a higher priority, with the previously reserved resources, than non-emergency calls. Flow moves from block 380 back to block 340.

In one embodiment of the invention, the emergency call processing (high priority) 154 includes a high priority message queue (emergency messages are placed on the high priority message queue to be processed), and the non-emergency call processing (normal priority) 156 includes a normal priority message queue (non-emergency messages are placed on the normal priority message queue for processing).

Thus, unlike typical implementations, which determine whether a message is for an emergency call, and thus requires high priority handling, by parsing the message (e.g., to determine whether the message includes an emergency indicator token), embodiments of the invention determine whether a message is for an emergency call prior to the message being parsed, based on which stream the message was carried on. It should be understood that in typical prior art implementations, a message corresponding to an emergency call may be waiting in the queue to be parsed behind other messages corresponding to non-emergency calls, and the prior art implementation cannot apply priority handling to the message corresponding to the emergency call until the message is parsed. In contrast, in embodiments of the invention described herein, messages for emergency calls may be processed using high priority handling prior to the messages being parsed. Thus, messages for emergency calls may be parsed prior to messages for non-emergency calls.

In one embodiment of the invention, the transport layer sockets 150 and 151 each include one or more socket buffers dedicated for emergency messages, and one or more socket buffers used for non-emergency messages. The emergency messages in the one or more sockets dedicated for emergency messages will be transmitted prior to the non-emergency messages. Thus, with embodiments of the invention described herein, emergency call messages may be sent and received prior to non emergency messages.

While embodiments of the invention have described the D-SBC 110 and the S-SBC 120 negotiating the number of transport streams (and the transport stream(s) dedicated for emergency calls), in alternative embodiments of the invention the number of transport streams and the number of transport streams dedicated for emergency calls is configured by an operator of the distributed session border controller system 100.

Figure 4:
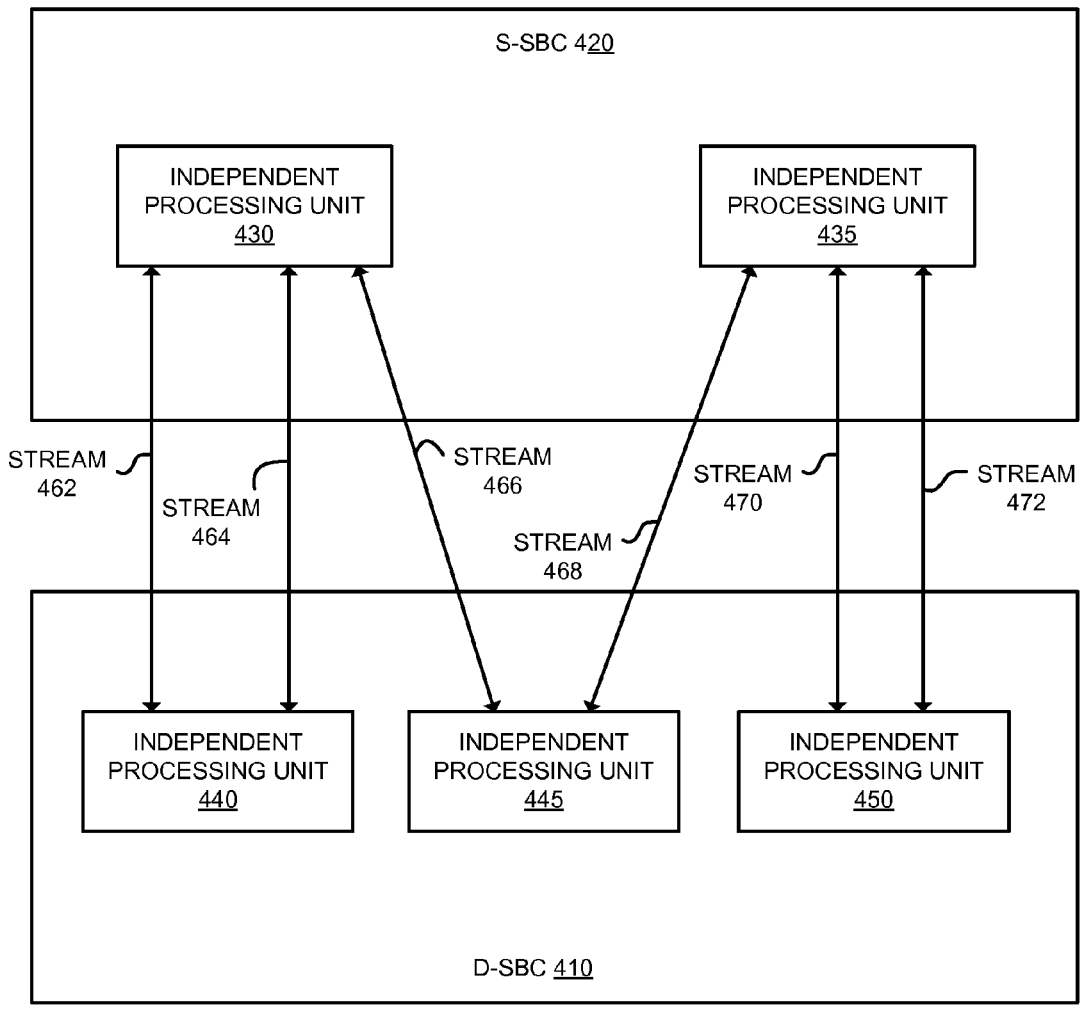
FIG. 4 illustrates a S-SBC and a D-SBC having multiple independent processing units according to one embodiment of the invention.

As previously described, in some embodiments of the invention the D-SBC 110 and/or the S-SBC 120 have multiple independent processing units (IPUs) (e.g., processor cores, processing threads, etc.). FIG. 4 illustrates the S-SBC 420 and the D-SBC 410 having multiple IPUs. The S-SBC 420 includes the IPUs 430 and 435, and the D-SBC 410 includes the IPUs 440, 445, and 450. It should be understood that although FIG. 4 illustrates both the S-SBC 420 and the D-SBC 410 having multiple IPUs, it should be understood that in some embodiments of the invention only one of the S-SBC 420 and the D-SBC 410 have multiple IPUs.

The number of transport streams between the S-SBC 420 and the D-SBC 410 may be negotiated as was previously described with reference to FIGS. 1, 2, and 3, or configured by an operator as previously described. According to one embodiment of the invention, the number of transport streams is equal to the least common multiple of the number of IPUs on the S-SBC 420 and the number of IPUs on the D-SBC 410. For example, in FIG. 4 the D-SBC 410 has three IPUs and the S-SBC 420 has two IPUs. Therefore, the number of transport streams is equal to the least common multiple of two and three (which is six). Thus, in FIG. 4 there are a total of six transport streams, transport streams 462, 464, 466, 468, 470, and 472. Of course, it should be understood that the number of transport streams may be determined differently.

As illustrated in FIG. 4, the transport streams between the S-SBC 420 and the D-SBC 410 are distributed among the IPUs. The streams may be distributed among the IPUs in different ways. For example, the streams may be divided equally among the IPUs on the S-SBC 420 and the D-SBC 410. FIG. 4 illustrates an equal distribution of transport streams. That is, the IPUs on the S-SBC 420 (IPUs 430 and 435) each have three transport streams, and the IPUs on the D-SBC 410 (IPUs 440, 445, and 450) each have two transport streams.

In one embodiment of the invention, transport streams dedicated for carrying emergency call messages are divided equally among the plurality of IPUs. For example, in FIG. 4, the transport stream 464 and the transport stream 470 may be dedicated for carrying emergency calls. It should be understood that distributing the dedicated transport streams to multiple IPUs allows processing emergency calls in a high priority prior to parsing those messages even if one or more of those IPUs fail. In another embodiment of the invention, transport streams dedicated for carrying emergency call messages are dedicated to a single IPU on the S-SBC 420 and the D-SBC 410.

Figure 5:
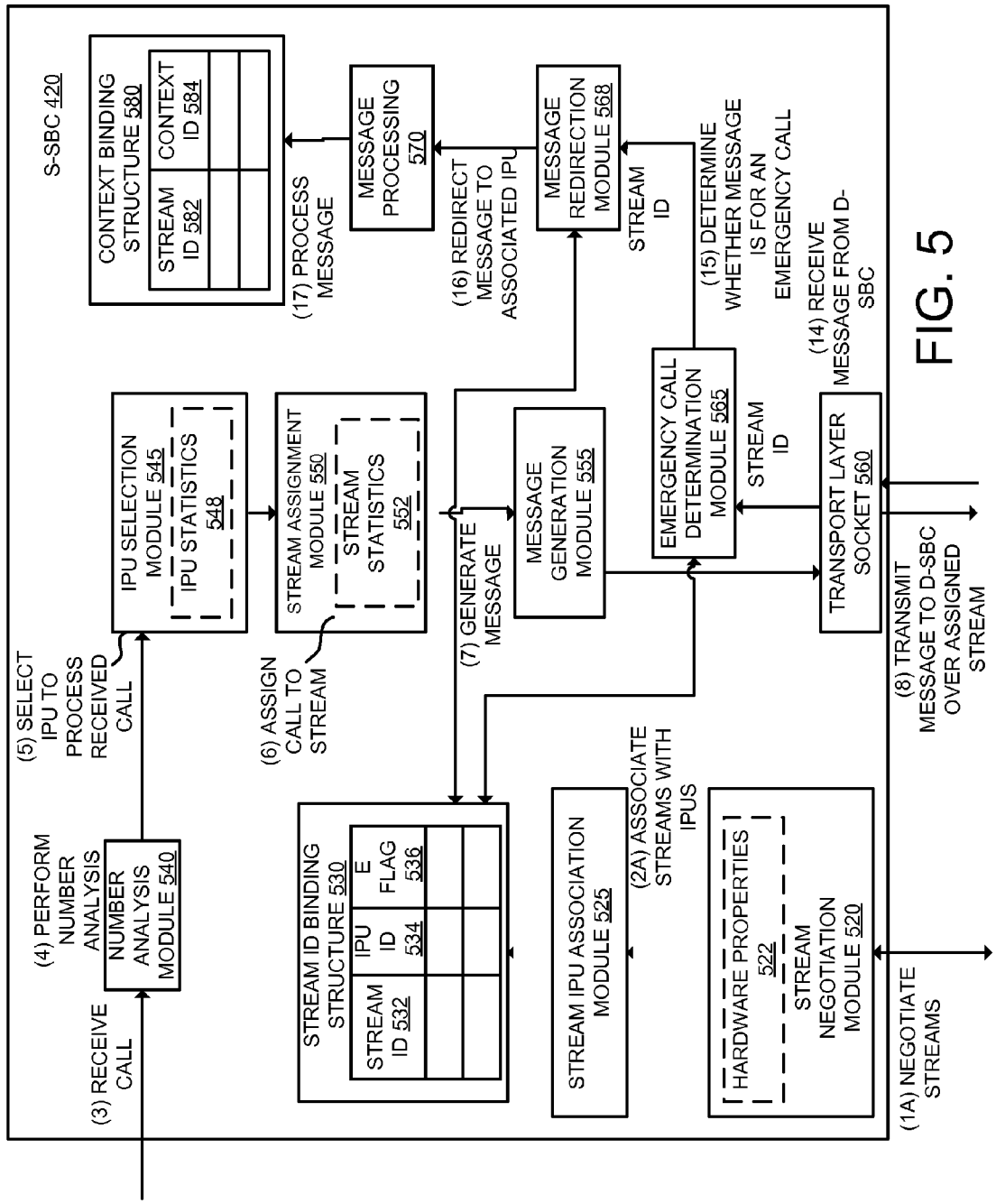
FIG. 5 is a data flow diagram illustrating an exemplary S-SBC having multiple independent processing units according to one embodiment of the invention.

FIG. 5 is a detailed view of the S-SBC 420 according to one embodiment of the invention. As illustrated in FIG. 5, the S-SBC 420 includes the stream negotiation module 520, the stream IPU association module 525, the stream ID binding structure 530, the number analysis module 540, the IPU selection module 545, the stream assignment module 550, the message generation module 555, the transport layer socket 560, the emergency call determination module 565, the message processing 570, and the context binding structure 580. Each of these will be described in greater detail later herein.

Figure 6:
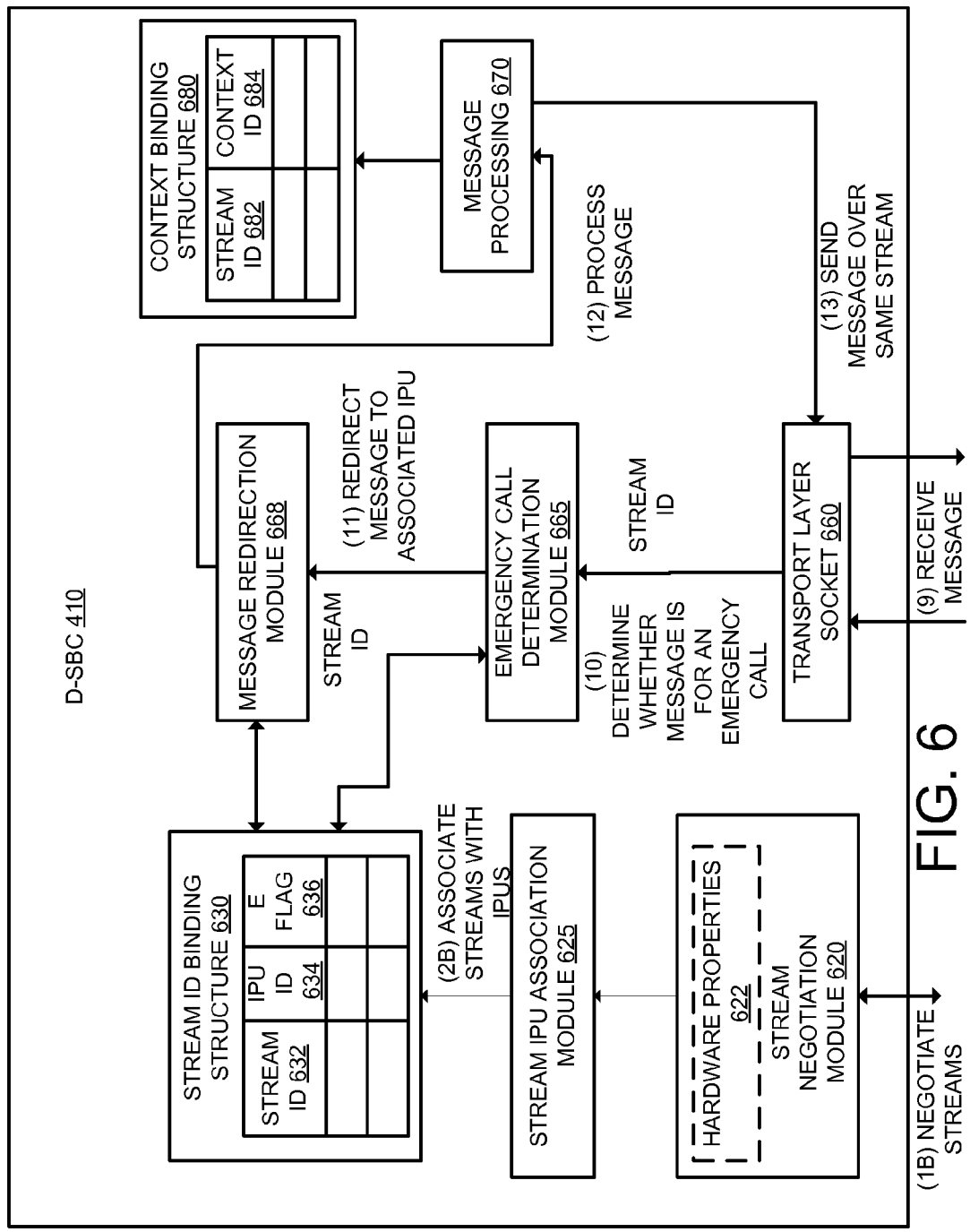
FIG. 6 is a data flow diagram illustrating an exemplary D-SBC having multiple independent processing units according to one embodiment of the invention.

FIG. 6 is a detailed view of the D-SBC 410 according to one embodiment of the invention. As illustrated in FIG. 6, the D-SBC 410 includes the stream negotiation module 620, the stream IPU association module 625, the stream ID binding structure 630, the transport layer structure 660, the emergency call determination module 665, the message redirection module 668, the message processing 670, and the context binding structure 680. Each of these will be described in greater detail later herein. The operations of FIG. 5 and FIG. 6 will be described together.

At operations 1A and 1B (illustrated in FIGS. 5 and 6 respectively), the stream negotiation modules 520 and 620 negotiate a number of transport streams. In one embodiment of the invention, the number of transport streams negotiated is based on the number of IPUs in the S-SBC 420 and the D-SBC 410. The hardware properties structure 522 includes the number of IPUs on the S-SBC 420, and the hardware properties structure 622 includes the number of IPUs on the D-SBC 410. In one embodiment of the invention, the number of transport streams is the least common multiple of the number of IPUs on the S-SBC 420 and the number of IPUs on the D-SBC 410. In one embodiment of the invention, as part of the negotiation, the stream negotiation modules 520 and 620 each allocate a subset of the negotiated transport streams to be dedicated for carrying messages for emergency calls.

After the streams are negotiated, at operations 2A and 2B (illustrated in FIGS. 5 and 6 respectively), the stream IPU association modules 525 and 625 each distributively associate the transport streams among the IPUs on the S-SBC 420 and the D-SBC 410 respectively. The association creates a binding between the stream identifiers of the transport streams and the IPUs. For example, the stream IPU association module 525 populates the stream ID binding structure 530, which includes a stream identifier field 532, an IPU identifier field 534, and an emergency flag field 536, and the stream IPU association module 625 populates the stream ID binding structure 630, which includes a stream identifier field 632, an IPU identifier field 634, and an emergency flag field 636. As described above, the transport streams may be distributively associated among the IPUs in different ways. For example, the transport streams may be divided equally among the IPUs on the S-SBC 420 and/or the D-SBC 410 (that is, each IPU is associated with approximately the same amount of transport streams). As another example, if there are transport streams dedicated for carrying messages for emergency calls, those transport streams may be assigned to a single IPU. The transport streams may be distributively associated differently on the S-SBC 420 than on the D-SBC 410.

Referring to FIG. 5, sometime after the transport streams have been assigned to the IPUs, at operation 3, the S-SBC 420 receives a call (e.g., the S-SBC 420 receives an invite message from a VoIP phone). At operation 4, the number analysis module 540 performs a number analysis on the received call to determine the dialed number.

Sometime after determining the dialed number, at operation 5, the IPU selection module 545 selects one of the IPUs to process the received call. According to one embodiment of the invention, the selection is based on the IPU statistics 548 and whether the call is an emergency call. The IPU statistics 548 includes information on the current load on each of the IPUs on the S-SBC 420 (e.g., the number of calls being processed, the amount of memory available, the amount of processing load, etc.). If the call is not an emergency call (as determined by the number analysis), the IPU selection module 545 selects the IPU that has the least amount of load to process the call. If the call is an emergency call, the IPU selection module 545 selects the least loaded IPU that processes emergency calls (e.g., have a transport stream dedicated for processing emergency calls).

After selecting the IPU to process the received call, at operation 6, the stream assignment module 550 assigns the call to one of the transport streams associated with the selected IPU. If the call is an emergency call (as determined by the number analysis module 540), the stream assignment module 550 assigns the call to one of the transport streams dedicated for carrying messages for emergency calls. In one embodiment of the invention, the selection is based on the stream statistics 552. The stream statistics 522 includes information on an estimate of the current load on the corresponding IPU on the D-SBC 410. According to one embodiment of the invention, the estimate of the current load on the corresponding IPU is determined from the average message response time over the transport streams over a period of time. A long message response time for a particular transport stream suggests that the load on that transport stream is heavy, while a shorter response time suggests that the transport stream is light. The stream assignment module 550 typically assigns the call to the transport stream with the least amount of load. For example, if the call is an emergency call, the stream assignment module 550 assigns the call to the transport stream dedicated for emergency calls that currently has the least amount of load.

After assigning the call to one of the transport streams, at operation 7 the message generation module 555 generates a message (e.g., an H.248 add request message) to send to the D-SBC 410. At operation 8, the message is sent through the transport layer socket 560 to the D-SBC 410 over the assigned stream.

Referring to FIG. 6, at operation 9, the D-SBC 410 receives the message at the transport layer socket 660, and the message is processed at the transport layer. As part of processing the message at the transport layer, the stream identifier of the transport stream on which the message was received is determined. The stream identifier is passed to the emergency call determination module 665, where at operation 10, determines whether the stream identifier is associated with a stream dedicated for emergency call messages. If the stream identifier is associated with a stream dedicated for emergency call messages, the message is processed at a high priority (similar to as described with reference to FIG. 1).

At operation 11, the message redirection module 668 determines which IPU is associated with the transport stream carrying the message, and redirects the message to that IPU. For example, the message redirection module 668 accesses the stream ID binding structure to determine which IPU is associated with the stream identifier.

At operation 12, the message processing module 670 processes the message. If the message is an H.248 add request message, the message processing module 670 allocates a context identifier and associates the context identifier and the stream identifier in the context binding structure 680 (which includes a stream identifier field 682 and a context identifier field 684). Sometime later, at operation 13, the message processing 670 causes a reply message to be transmitted to the S-SBC 420 over the same transport stream it received the message on and including the context identifier.

Referring back to FIG. 5, at operation 14, the S-SBC 420 receives a message from the D-SBC 410 at the transport layer socket 560. As part of processing the message, the stream identifier of the stream carrying the message is determined. The stream identifier is passed to the emergency call determination module 565, which at operation 15, determines whether the stream identifier belongs to a stream dedicated for carrying messages for emergency calls. If the message is for an emergency call, the S-SBC 420 will give high priority handling to the message.

The stream identifier of the stream is also passed to the message redirection module 568. At operation 16, the message redirection module 568 redirects the message to the IPU associated with the stream identifier. For example, the message redirection module 568 accesses the stream ID binding structure 530 to determine the associated IPU for the stream identifier and redirects the message to that IPU. In one embodiment of the invention, the message redirection module 568 includes an indication whether the message is for an emergency call when redirecting the message to the IPU.

Sometime after redirecting the message to the IPU, at operation 17 the message is processed at message processing module 570. The message processing module 570 creates a binding between the context identifier and the stream identifier of the message. For example, the message processing module 570 creates an entry in the context binding structure 580, which includes a stream identifier field 582 and a context identifier field 584.

It should be understood that for the duration of the call, any messages sent between the S-SBC 420 and the D-SBC 410 for the call are redirected to the IPU associated with the stream carrying the message, and the context identifier is not used during the redirection. It should also be understood that in order to determine the context identifier, the message must be parsed. Thus, unlike typical implementations which redirect messages based on the context identifier (and thus require parsing of the message prior to redirection), embodiments of the invention redirect the message based on the stream identifier prior to parsing the message.

Figure 9:
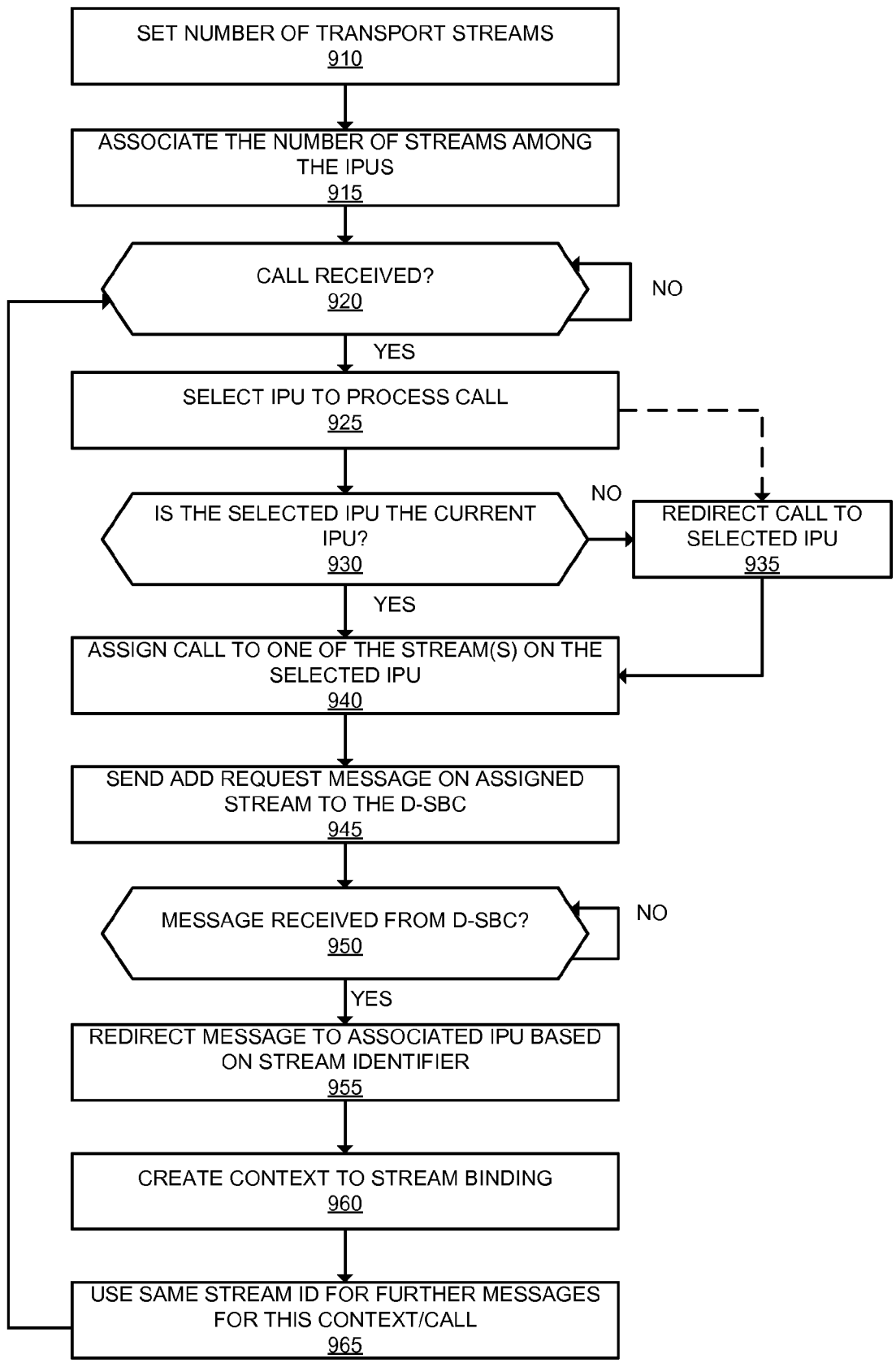
FIG. 9 is a flow diagram illustrating operations performed by a S-SBC with multiple IPUs according to one embodiment of the invention.

FIG. 9 is a flow diagram illustrating operations performed by a S-SBC with multiple IPUs according to one embodiment of the invention. At block 910, the S-SBC sets a number of transport streams (e.g., SCTP streams) that will be used to carry messages (e.g., H.248 messages) between the S-SBC and a D-SBC. According to one embodiment of the invention, the number of transport streams are negotiated between the S-SBC and a corresponding D-SBC. According to another embodiment of the invention, the number of transport streams is configured by an operator.

According to one embodiment of the invention, the S-SBC dedicates a subset of the number of transport steams for carrying messages for emergency calls. Flow moves from block 910 to block 915.

At block 915, the S-SBC distributively associates the number of streams among the IPUs. As described above, the S-SBC may distribute the number of streams in different ways in different embodiments of the invention (e.g., equal distribution of all streams, distribution of streams based on type of stream (e.g., non-emergency type, emergency type), etc.). Flow moves from block 915 to block 920, where the S-SBC waits to receive a call from a VoIP phone. When a call is received, flow moves to block 925.

At block 925, the S-SBC selects an IPU to process the call. The S-SBC may select which IPU will process the call any number of ways (e.g., randomly, the least loaded IPU, sequentially, etc.). If the call is an emergency call (e.g., as determined by performing number analysis on the dialed number), the S-SBC selects an IPU that has a stream dedicated for emergency calls. Flow moves from block 925 to block 930.

At block 930, a determination is made whether the selected IPU is the current IPU. In some embodiments of the invention, each IPU on the S-SBC is capable of receiving calls from VoIP phones and processing those calls. In these embodiments, the IPU that received the call may be the same IPU selected to process the call. If the IPU that received the call is also the IPU selected to process the call, flow moves to block 940. If the IPU that received the call is not the IPU selected to process the call, flow moves to block 935 where the call is redirected to the selected IPU. Flow moves from block 935 to block 940.

In other embodiments of the invention, one or more IPUs are dedicated to receive calls from the VoIP phones, but do not process those calls. In these embodiments of the invention, the operation of block 930 is not performed and the IPU receiving the call will redirect the call to the selected IPU. Thus, flow will move from block 925 to block 935, which is represented by a dashed line in FIG. 9.

At block 940, the call is assigned to one of the transport stream(s) on the selected IPU (i.e., one of the streams that the selected IPU is associated with). The call may be assigned to a transport stream in a number of ways (e.g., randomly, sequentially, based on the least loaded stream, etc.). Flow moves from block 940 to block 945, where an add request message (e.g., an H.248 ADD request message) is transmitted to the D-SBC over the assigned stream. Flow moves from block 945 to block 950.

At block 950, the S-SBC waits to receive a message from the D-SBC. When the S-SBC receives a message from the D-SBC, it redirects the message to the associated IPU based on the stream identifier of the stream carrying the message if necessary (e.g., if the IPU that receives the message from the D-SBC is not the IPU associated with the stream identifier of the stream carrying the message). It should be understood that the redirection occurs prior to parsing the message (thus, the S-SBC does not parse the message to determine the context identifier of the message before redirecting the message). Flow moves from block 955 to block 960.

At block 960, the message is parsed and the a binding is created between the context identifier in the message and the stream identifier of the stream carrying the message. Flow moves from block 960 to block 965, where the same stream identification is used for further messages for this context/call. Flow moves from block 965 back to block 920.

Figure 10:
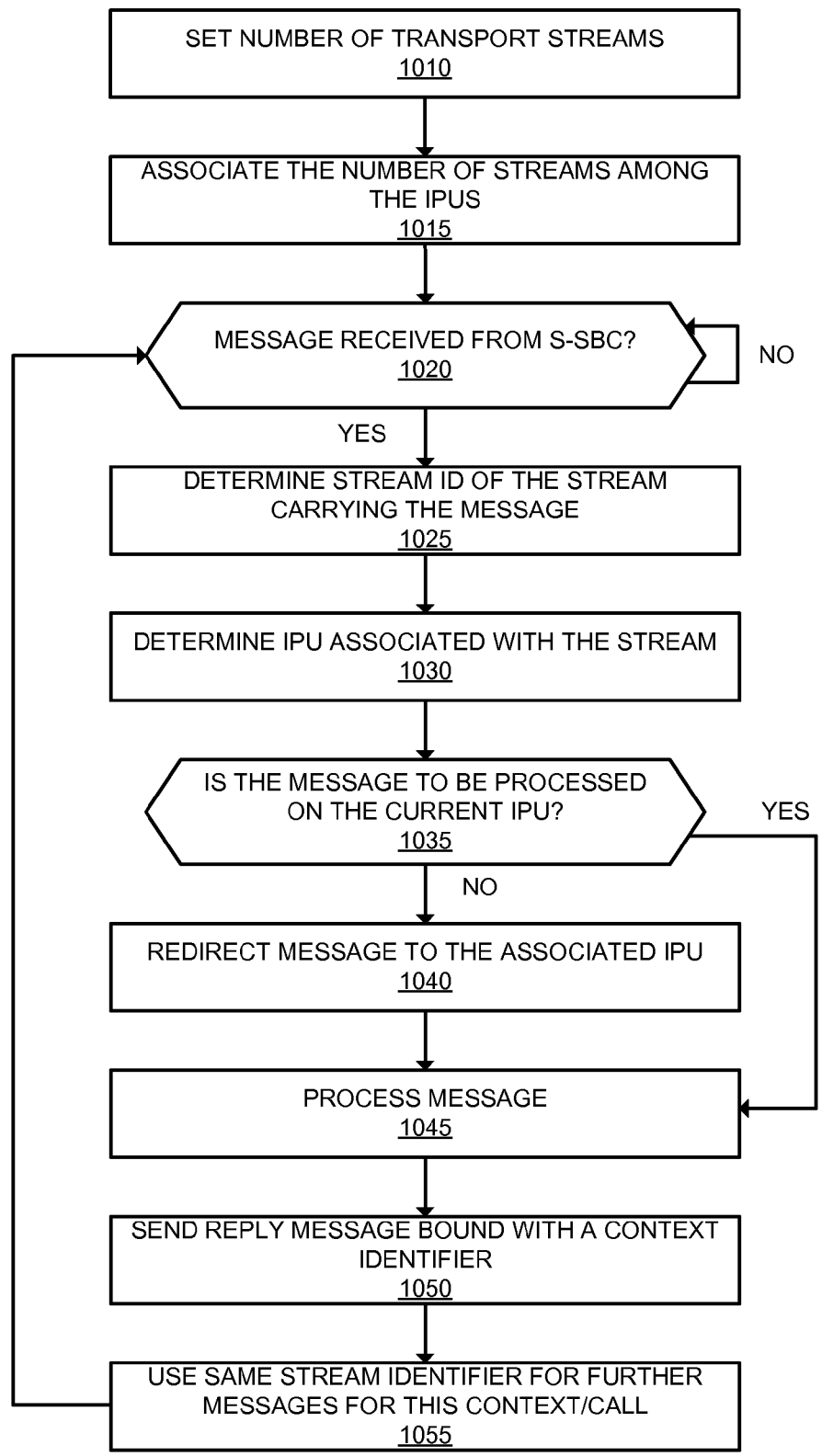
FIG. 10 is a flow diagram illustrating operations performed by a D-SBC with multiple IPUs according to one embodiment of the invention.

FIG. 10 is a flow diagram illustrating operations performed by a D-SBC with multiple IPUs according to one embodiment of the invention. At block 1010, the D-SBC sets a number of transport streams (e.g., SCTP streams) that will be used to carry messages (e.g., H.248 messages) between the D-SBC and a S-SBC. According to one embodiment of the invention, the number of transport streams are negotiated between the D-SBC and the corresponding S-SBC. According to another embodiment of the invention, the number of transport streams is configured by an operator of the D-SBC.

According to one embodiment of the invention, the D-SBC dedicates a subset of the number of transport steams for carrying messages for emergency calls. Flow moves from block 1010 to block 1015.

At block 1015, the D-SBC distributively associates the number of streams among the IPUs. As described above, the D-SBC may distribute the number of streams in different ways in different embodiments of the invention (e.g., equal distribution of all streams, distribution of streams based on type of stream (e.g., non-emergency type, emergency type), etc.). Flow moves from block 1015 to block 1020, where the D-SBC waits to receive a message for a call from the S-SBC. When a message from the D-SBC is received, flow moves to block 1025.

At block 1025, the stream identifier of the stream carrying the message is determined. According to one embodiment of the invention, the stream identifier is determined once the message has been processed at the socket layer. If the stream identifier is associated with a stream dedicated for carrying emergency messages, the message will be processed at a high priority. Flow moves from block 1025 to block 1030.

At block 1030, the IPU associated with the stream identifier is determined. Flow moves from block 1030 to block 1035, where a determination is made whether the message needs to be redirected to a different IPU for processing. For example, the message will be redirected if the IPU that received the message is not the IPU associated with the stream identifier. If the IPU that received the message is the IPU associated with the stream identifier, then flow moves to block 1045. If the IPU that received the message is not the IPU associated with the stream identifier, then flow moves to block 1040, where the message is redirected to the associated IPU. Flow moves from block 1040 to block 1045.

At block 1045, the message is processed. For example, a context identifier is allocated for the call and the context identifier is bound with the stream identifier. Flow moves from block 1045 to block 1050, where the D-SBC sends a reply message to the S-SBC, the reply message indicating the context identifier. Flow moves from block 1050 to block 1055, where for the duration of the call the same stream identifier is used for further messages between the D-SBC and the S-SBC for this context/call. Flow moves from block 1055 back to block 1020.

Thus, with embodiments of the invention described herein, emergency call processing is improved. By preallocating resources for emergency call processing, the system will not reject an emergency call due to lack of resources if there are resources remaining in the preallocated resources. In addition, since messages for emergency calls may be identified by the stream identifier of the stream carrying the message, high priority handling for the emergency calls may begin as soon as the message is received from the socket layer prior to the message being parsed. Also, load balancers of the S-SBC and/or the D-SBC may use the stream identifier to determine which IPU to process the messages prior to the message being parsed to determine a context identifier.

Since embodiments of the invention describe identifying messages for emergency calls based on the streams carrying the messages, the creation and inclusion of an emergency indicator token in the messages is optional.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for a signaling session border controller (S-SBC) to provide emergency call identification to a data session border controller (D-SBC), the method comprising:
   establishing a plurality of transport protocol streams with the D-SBC;
   allocating a subset of the plurality of established transport protocol streams to be dedicated for emergency calls;
   reserving resources for processing of emergency calls; and
   responsive to receiving an emergency call, performing the following:
      assigning the emergency call to one of the allocated transport protocol streams dedicated for emergency calls, and
      transmitting an add call request corresponding with the received emergency call to the D-SBC over the assigned transport protocol stream, wherein assigning the emergency call and transmitting the add call request is performed with the reserved resources.

2. The method of claim 1, wherein the transport protocol streams are established through a negotiation between the S-SBC and the D-SBC, wherein the transport protocol streams are Stream Control Transmission Protocol (SCTP) streams each including a stream identifier, and wherein allocating the subset of the plurality of established transport protocol streams includes associating those corresponding stream identifiers as emergency stream identifiers, and wherein the D-SBC allocates the same subset of the plurality of negotiated transport protocol streams to be dedicated for emergency calls, and wherein the transmitted emergency call request is a H.248 add message encapsulated in a SCTP stream including a SCTP stream identifier which indicates to the D-SBC that the request message is for an emergency call.

3. The method of claim 2, wherein the H.248 add message does not include an emergency indicator token.

4. The method of claim 1, wherein the S-SBC has a plurality of independent processing units (IPUs), the method further comprising:
   associating the allocated transport protocol streams with different ones of the plurality of IPUs on the S-SBC;
   wherein responsive to receiving the emergency call, further performing:
      selecting one of the IPUs associated with the allocated transport protocol stream to process the emergency call, wherein the emergency call is assigned to a least loaded one of the allocated transport protocol streams allocated with the selected IPU.

5. The method of claim 4, wherein the IPUs associated with the allocated transport protocol streams are dedicated for processing emergency calls.

6. A method for a data session border controller (D-SBC) to identify emergency calls, the method comprising:
   establishing a plurality of transport protocol streams with a signaling session border controller (S-SBC) coupled with the D-SBC;
   allocating a subset of the plurality of established transport protocol streams to be dedicated for emergency calls;
   reserving resources for processing emergency calls;
   upon receiving a message over one of the allocated transport protocol streams dedicated for emergency calls, processing that message at a high priority using at least some of the reserved resources.

7. The method of claim 6, wherein the plurality of transport protocol streams are established through a negotiation between the D-SBC and the S-SBC, wherein the transport protocol streams are Stream Control Transmission Protocol (SCTP) streams each including a stream identifier, wherein the allocated SCTP streams includes associating those corresponding stream identifiers as emergency streams, and wherein the message is a H.248 add message encapsulated in a SCTP stream over one of the allocated SCTP streams.

8. The method of claim 6, wherein the message is received at an Internet Protocol (IP) socket of the D-SBC, wherein the message is placed into a high priority queue for processing prior to parsing the message.

9. The method of claim 6, wherein the message does not include an emergency token indicator.

10. The method of claim 6, wherein the D-SBC has a plurality of independent processing units (IPUs), the method further comprising:
   associating the allocated transport protocol streams with different ones of the plurality of IPUs; and wherein responsive to receiving the message, further performing:
   determining a stream identifier corresponding to the allocated transport protocol stream on which the message was received,
   determining which one of the plurality of IPUs is associated with the determined stream identifier, and
   redirecting the message to that IPU for high priority processing if that IPU is not currently processing the message.

11. The method of claim 7, wherein the IPUs associated with the allocated transport protocol streams are dedicated for processing emergency calls.

12. A method in a distributed session border controller (SBC) system to identify emergency calls without using an emergency token, wherein the SBC system includes a signaling SBC (S-SBC) coupled with a data SBC (D-SBC), the method comprising:
   establishing a plurality of transport protocol streams between the S-SBC and the D-SBC;
   allocating a subset of the plurality of the established transport protocol streams between the S-SBC and the D-SBC to be dedicated for carrying messages for emergency calls, wherein each allocated transport protocol stream is identified on the S-SBC and the D-SBC with a stream identifier;
   reserving resources for processing of emergency calls on the S-SBC and the D-SBC;
   responsive to the S-SBC receiving an emergency call, the S-SBC performing the following:
      assigning the emergency call to one of the allocated transport protocol streams dedicated for emergency calls using at least some of the reserved resources, and
      transmitting an add request message corresponding with the received emergency call to the D-SBC over the assigned transport protocol stream using at least some of the reserved resources;
   upon receiving the add request message at the D-SBC on one of the allocated transport protocol streams, the D-SBC performing the following:
      determining that a stream identifier corresponding to the transport protocol stream on which the message was received is associated with a transport protocol stream dedicated for carrying messages for emergency calls, and
      processing the add request message at a high priority using at least some of the reserved resources of the D-SBC.

13. The method of claim 12, wherein the plurality of transport protocol streams are established through a negotiation between the S-SBC and the D-SBC, wherein the transport protocol streams are Stream Control Transmission Protocol (SCTP) streams each including a stream identifier, and wherein allocating the subset of the plurality of established transport protocol streams includes associating those corresponding stream identifiers as emergency stream identifiers, and wherein the D-SBC allocates the same subset of the plurality of negotiated transport protocol streams to be dedicated for emergency calls, and wherein the transmitted emergency call request is a H.248 add message encapsulated in a SCTP stream including a SCTP stream identifier which indicates to the D-SBC that the request message is for an emergency call.

14. The method of claim 12, wherein the S-SBC and the D-SBC each has a plurality of independent processing units (IPUs), the method further comprising:
   associating the allocated transport protocol streams with different ones of the plurality of IPUs on the S-SBC and D-SBC;
   wherein responsive to receiving the emergency call, the S-SBC to further perform:
      selecting one of the IPUs associated with the allocated transport protocol stream to process the emergency call, wherein the emergency call is assigned to a least loaded one of the allocated transport protocol streams allocated with the selected IPU;
   wherein responsive to the D-SBC receiving the add request message, the D-SBC further to perform:
      determining a stream identifier corresponding to the transport protocol stream on which the add request message was received,
      determining which one of the plurality of IPUs on the D-SBC is associated with the stream identifier, and
      redirecting the add request message to that IPU.

15. A distributed session border controller (SBC) system for processing emergency calls, the SBC system comprising:
   a signaling SBC (S-SBC) coupled with a data SBC (D-SBC), wherein the S-SBC and the D-SBC communicate messages over a plurality of transport protocol streams, each transport protocol stream including a stream identifier, wherein a subset of the plurality of transport protocol streams are each dedicated for carrying messages relating to emergency calls, the S-SBC including,
      a number analysis module to determine whether received calls are emergency calls,
      a call stream assignment module to assign the received calls to one of the plurality of transport protocol streams, wherein the call assignment module is to assign emergency calls to one of the subset transport protocol streams dedicated for carrying messages related to emergency calls, and
      a message generation module to generate messages to transmit to the D-SBC over the assigned transport protocol stream; and
   the D-SBC including,
      an amount of resources reserved for processing emergency calls,
      a transport protocol socket to receive messages from the S-SBC carried on the plurality of transport protocol streams and process the messages at the transport layer, wherein the stream identifiers are determined through processing of the messages at the transport layer,
      an emergency call determination module coupled with the transport protocol socket, the emergency call determination module to determine whether a stream identifier corresponding to the transport protocol stream on which a message was received is associated with one of the subset transport protocol streams dedicated for carrying messages for emergency calls, wherein messages for emergency calls are processed using at least some of the reserved resources and at a higher priority than messages not for emergency calls.

16. The distributed SBC system of claim 15, wherein the transport protocol streams are Stream Control Transmission Protocol (SCTP) streams and the message generation module generates H.248 messages.

17. The distributed SBC system of claim 15, wherein the S-SBC and the D-SBC each include a transport protocol stream negotiation module to negotiate the plurality of transport protocol streams.

18. The distributed SBC system of claim 15, wherein the plurality of transport protocol streams is configured by an operator of the S-SBC or the D-SBC.

19. The distributed SBC system of claim 15, wherein the D-SBC further includes, a plurality of independent processing units (IPUs);
   a stream to IPU association module to associate the allocated transport protocol streams with different ones of the plurality of IPUs; and
   a message redirection module coupled with the emergency call determination module, the message redirection module to redirect messages to appropriate ones of the IPUs based on the stream identifiers included in the messages.

20. The distributed SBC system of claim 15, wherein the S-SBC further includes, a plurality of independent processing units (IPUs);
   a stream to IPU association module to associate the allocated transport protocol streams with different ones of the plurality of IPUs; and
   an IPU selection module coupled with the number analysis module to select one of the plurality of IPUs for each incoming call; and
   wherein the call stream assignment module is coupled with the IPU selection module and is to assign incoming calls to one of the allocated protocol transport streams associated with the selected IPU.

* * * * *